United States Patent [19]

Isozumi et al.

[11] Patent Number: 4,952,831
[45] Date of Patent: Aug. 28, 1990

[54] DEVICE FOR WATERPROOFING AROUND TERMINAL BOLT

[75] Inventors: Shuzoo Isozumi; Keiichi Konishi, both of Hyogo, Japan

[73] Assignee: Mitsubishi Denki Kabushiki Kaisha, Tokyo, Japan

[21] Appl. No.: 371,880

[22] Filed: Jun. 27, 1989

[30] Foreign Application Priority Data

Jul. 7, 1988 [JP] Japan .................. 63-90267/88[U]

[51] Int. Cl.⁵ ........................... H02K 5/10; H02K 5/00
[52] U.S. Cl. .................. 310/71; 174/153 R; 310/88; 439/556
[58] Field of Search ............. 16/2; 277/178; 174/152 R, 153 R; 285/162, 196, 338, 48; 310/71, 87, 88, 89, 68 D; 439/271, 272, 556, 558, 559, 587

[56] References Cited

U.S. PATENT DOCUMENTS

| 2,682,570 | 6/1954 | Elliot | 174/153 R |
| 2,868,868 | 1/1959 | Corey | 174/153 R |
| 3,502,856 | 3/1970 | Daley | 174/152 R |
| 4,522,378 | 6/1985 | Nelson | 16/2 |
| 4,720,645 | 1/1988 | Stroud | 310/68 D |
| 4,737,654 | 4/1988 | Morishita et al. | |

FOREIGN PATENT DOCUMENTS 57-52773  9/1982  Japan .

Primary Examiner—Mark O. Budd
Assistant Examiner—D. L. Rebsch
Attorney, Agent, or Firm—Sughrue, Mion, Zinn, Macpeak & Seas

[57] ABSTRACT

A device for waterproofing around a terminal bolt comprising an electric insulator secured on a shank of the terminal bolt, which is located inside a casing a grommet, made of an elastic material, is tightly fitted in an opening of the casing that is located in contact with the electric insulator at the bottom of the grommet. The grommet has an insertion hold through which the outer portion of the terminal bolt, which projects from the casing, extends. A rigid sleeve, which has a top flange, is tightly fitted in the insertion hole of the grommet between the outer portion of the terminal bolt and the grommet, such that the length from the bottom of the top flange to the lower end of the sleeve is less than the depth of the insertion hole of the grommet.

6 Claims, 2 Drawing Sheets

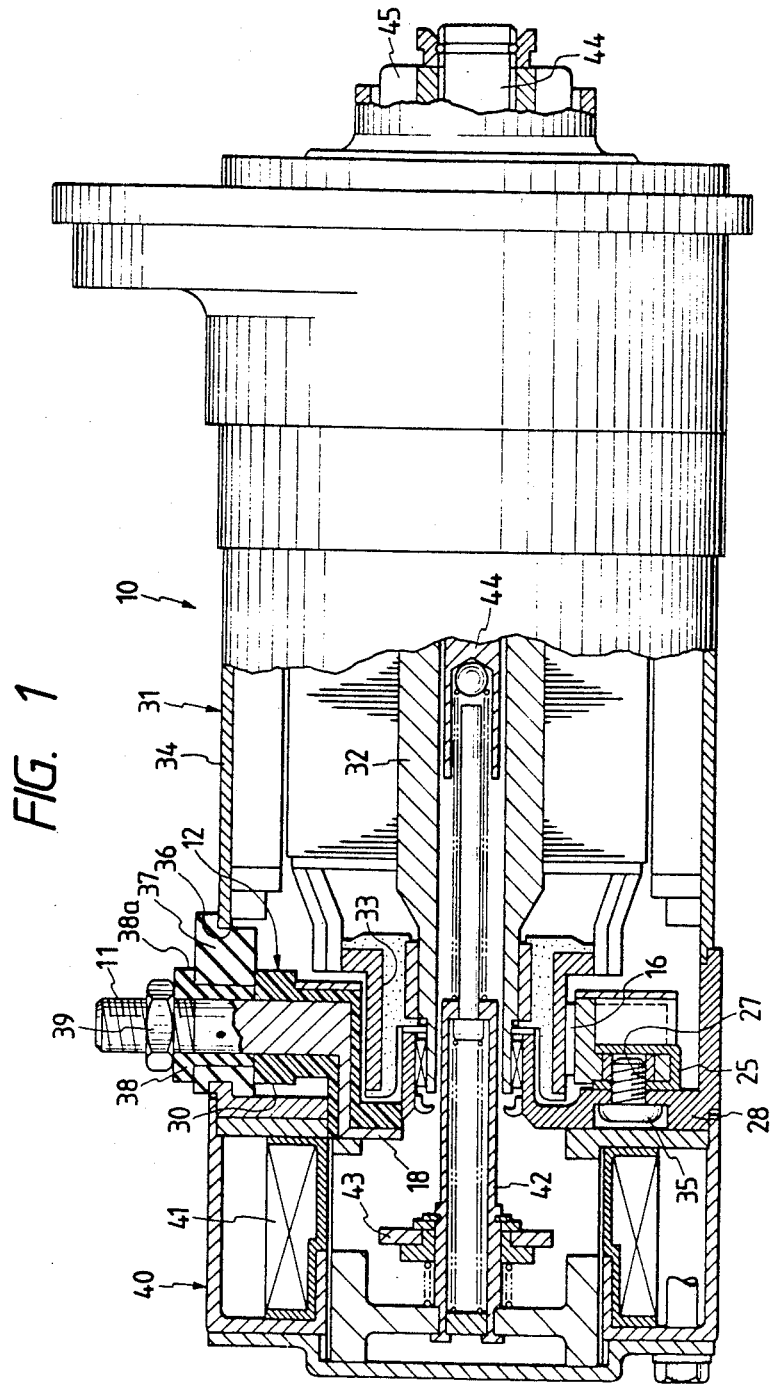

DEVICE FOR WATERPROOFING AROUND TERMINAL BOLT

BACKGROUND OF THE INVENTION

The present invention relates to a device for waterproofing around a terminal bolt, and particularly relates to a waterproofing device for preventing water from entering from around a terminal bolt projecting from the casing of a coaxial starter.

In a coaxial starter, an electromagnetic switch is provided at one end of a DC motor in such a manner that the actuator of the switch, the armature shaft of the motor and an output rotary shaft are disposed coaxially to each other, as disclosed in the Japanese Patent Application Examined Publication No. 52773/82. Since the electromagnetic switch is provided at one end of the dc motor, a terminal bolt for electrically connecting the battery of a vehicle to the plus brush of the motor through the fixed and movable contacts of the switch projects from the casing of the coaxial starter. In a conventional device for waterproofing the portion of the casing, through which the terminal bolt extends, a rubber grommet having a groove on the outside circumferential surface of the grommet is fitted in an opening of the casing so as to engage the edge of the casing around the opening thereof in the groove of the grommet, the terminal bolt is inserted through the center hole of the grommet, and a nut as a tightening member is screw-engaged with the terminal bolt so as to put the grommet in pressure contact with the casing around the opening thereof. However, since the nut directly presses the grommet onto the casing, the nut can be rotated to any extent as far as the grommet is deformed by the nut. For that reason, there is a problem that it is very difficult to properly set the degree of tightening of the nut onto the grommet. Besides, since the nut is in contact with the grommet but not with the casing, the nut is always in an insufficiently tightened state. For that reason, there is another problem, in that the nut and a lead wire for attaching a lead wire extending from the battery or the brush are very likely to loosen due to the intense vibration of the vehicle.

SUMMARY OF THE INVENTION

The present invention was made in order to solve the above-mentioned problems.

Accordingly, it is an object of the present invention to provide a device for waterproofing around a terminal bolt projecting from a casing through the notch thereof, in which a waterproofing grommet is always kept in tight contact with a prescribed surface by constant pressure, and a tightening member such as a nut does not loosen due to vibration or the like.

The device comprises an electric insulator secured on the shank of the terminal bolt, which is located inside the casing. A grommet, made of an elastic material, is tightly fitted in the opening of the casing, that is located in contact with the electric insulator at the bottom of the grommet. The grommet has an insertion hole through which the outer portion of the terminal bolt, which projects from the casing, extend. A rigid sleeve, which has a top flange, is tightly fitted in the insertion hole of the grommet, between the outer portion of the terminal bolt and the grommet, such that the length from the bottom of the top flange to the lower end of the sleeve is smaller than the depth of the insertion hole of the grommet. The sleeve is fitted on the terminal bolt. A nut is engaged with the terminal bolt and tightened. Instead of that, the sleeve may be threaded on the inside circumferential surface thereof to act as a nut. Since the nut engaged with the terminal bolt is tightened, the sleeve is moved deeper into the insertion hole of the grommet and the top flange of the sleeve downwardly presses the grommet toward the top of the electric insulator provided around the shank of the terminal bolt so that the grommet is deformed and, therefore, tightly fitted on the peripheral surface of the sleeve. When the grommet is pressed to an appropriate extent by the top flange of the sleeve, the lower end of the sleeve comes into contact with the top of the insulator so that the sleeve cannot be moved in any deeper. Since the rigid sleeve is thus tightened by the nut, the nut is very firmly fixed to the terminal bolt. As a result, the pressure on the grommet is kept constant, and the sleeve and the nut, which act to apply the pressure to the grommet, do not loosen due to vibration or the like. Therefore, the reliability of the device is high.

BRIEF DESCRIPTION OF THE DRAWINGS

FIG. 1 shows a cutaway sectional view of a coaxial starter provided with a device which is an embodiment of the present invention and is for waterproofing around the terminal bolt of the starter;

DETAILED DESCRIPTION OF EXEMPLARY EMBODIMENT

An embodiment of the present invention is hereafter described in detail with reference to the drawings attached hereto.

Figure 3:
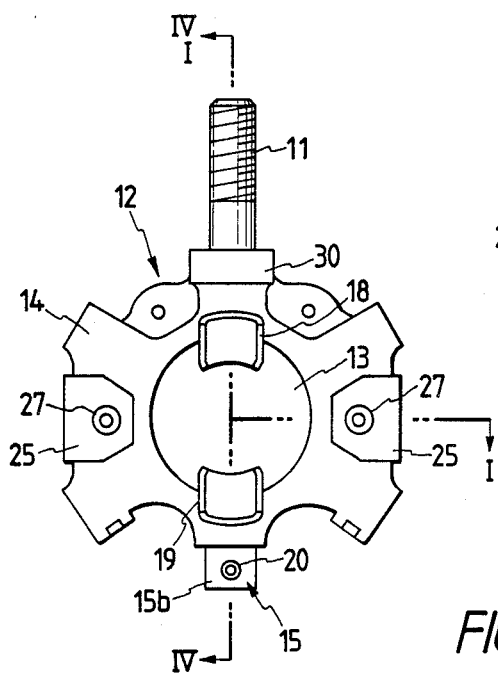
FIG. 3 shows a rear view of the brush support and terminal assembly and indicates a line I—I along which the sectional view shown in FIG. 1 is taken.
Figure 2:
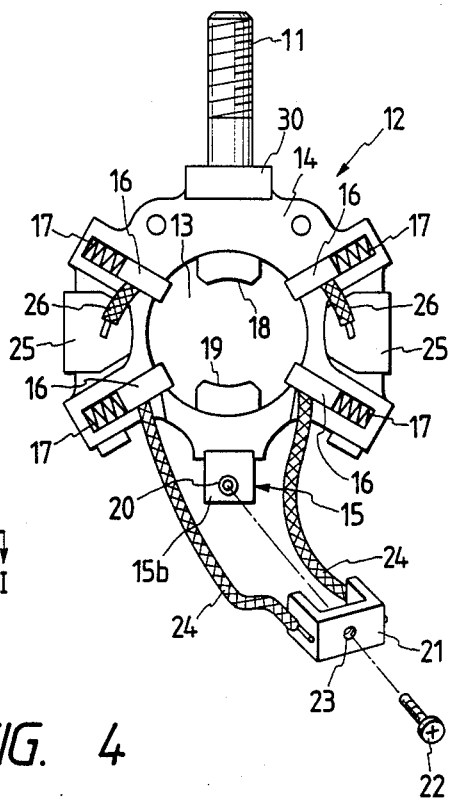
FIG. 2 shows a front view of a brush support and terminal assembly which is a component of the coaxial starter and includes the terminal bolt.
Figure 4:
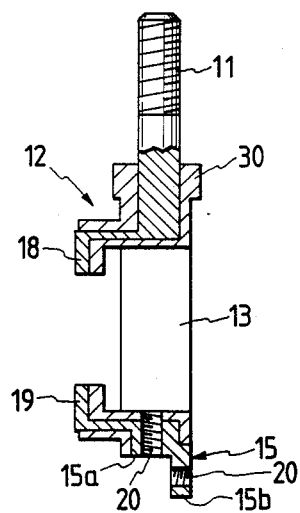
FIG. 4 shows a sectional view of the brush support and terminal assembly along a line IV—IV shown in FIG. 3.

FIG. 1 shows a coaxial starter 10 provided with a waterproofing device for waterproofing around the terminal bolt 11 of the starter. The terminal bolt 11 is a part of a brush support and terminal assembly 12 including a plastic plate 14 having a circular opening 13 in the central portion of the plate as shown in FIGS. 2 and 4. The top of the plate 14 is fitted with the terminal bolt 11 whose butt portion is coated with a molded plastic constituting the plate. The bottom of the plate 14 is fitted with a terminal 15 having an L-shaped longitudinal section and coated with the molded plastic. Four brushes 16 are supported on one side of the plate 14 so that the brushes are movable in the radial direction of the circular opening 13. Pushing forces for moving the brushes 16 toward the center of the opening 13 are always applied to the brushes by springs 17. Two fixed contacts 18 and 19 are provided on the other side of the plate 14 and project therefrom. The fixed contacts 18 and 19 are formed integrally with the terminal bolt 11 and the terminal 15 as shown in FIG. 4, and are electrically connected to the bolt and the terminal, respectively, so that the bolt serves as a terminal for the contact 18, and the terminal 15 serves for the other contact 19. The terminal 15 has a mounting portion 15a extending horizontally, and another mounting portion 15b extending vertically from one end of the former.

Each of the mounting portions 15a and 15b has a tapped hole 20. The electric coil lead of the electromagnetic switch 40 of the coaxial starter 10 is attached to the mounting portion 15a by a screw. A U-shaped connector 21 shown in FIG. 2 is attached to the other mounting portion 15b by a screw 22 extending through the hole 23 of the connector and engaged in the tapped hole 20 of the mounting portion. The ends of lead wires 24 extending from the plus brushes 16 are connected to both the side portions of the U-shaped connector 21 by welding or the like. U-shaped metal plates 25 are attached to both the middle-height portions of the plastic plate 14 in such a manner that each of the U-shaped metal plates pinches the plastic plate. Lead wires 26 extending from the minus brushes 16 are connected to the portions of the U-shaped metal plates 25 on one side of the plastic plate 14. The other portions of the metal plates 25 on the other side of the plastic plate 14 are provided with tapped holes 27 which extend to the plastic plate and are used to secure the brush support and terminal assembly 12 to the rear cover 28 of the coaxial starter 10 when the assembly is mounted in the starter so that the metal plates serve as grounding terminals electrically connected to the casing of the starter. An electric insulator 30 is constituted by the plastic molded on the butt portion of the terminal bolt 11.

The brush support and terminal assembly 12 is pinched between the rear cover 28 of the coaxial starter 10 and the rear end of the yoke 34 of the dc motor 31 of the starter so that a commutator 33 belonging to the motor and mounted on the armature shaft 32 thereof is located in the center opening 13 of the plastic plate 14. Screws 35 are inserted through the holes of the rear cover 28 and engaged in the tapped holes 27 of the metal plates 25 so that the assembly 12 is secured to the coaxial starter 10. The terminal bolt 11 projects outward through the notch 36 of the casing composed of the rear cover 28 and the yoke 34. The insulator 30 is located inside the casing.

The constitution and operation of the waterproofing device are described below. The device comprises the electric insulator 30, a grommet 37 and a flanged sleeve 38. The grommet 37 is made of an elastic material such as rubber and fitted in the notch 36 of the casing so that the peripheral projection of the grommet is engaged with the edge of the casing around the notch and the bottom of the grommet is in contact with the top of the insulator 30. The terminal bolt 11 projects outward through the insertion hole of the grommet 37 whose inside diameter is larger than the diameter of the bolt. The flanged sleeve 38 is provided around the terminal bolt 11 and fitted in the insertion hole of the grommet 37. Since the inside diameter of the sleeve 38 is equal to the outside diameter of the terminal bolt 11 and the outside diameter of the sleeve is equal to the inside diameter of the grommet 37, the sleeve is tightly fitted both on the terminal bolt 11 and in the insertion hole of the grommet. The length from the bottom of the top flange 38a of the sleeve 38 to the lower end thereof is smaller than the depth of the insertion hole of the grommet.

When a nut 39 is engaged with the terminal bolt 11 and tightened onto the sleeve 38, the top flange 38a of the flange presses the top of the grommet 37 and the sleeve is moved deeper into the insertion hole of the grommet so that the tightness of the grommet to the casing and the insulator 30 is increased and the deformation of the grommet pressed by the sleeve results in increasing the tightness of the grommet to the peripheral surface of the sleeve. The pressure thus applied to the grommet 37 always prevents a water entry clearance from being generated.

When the top flange 38a of the sleeve 38 is pressed onto the grommet 37 to a desired extent by the tightened nut 39, the lower end of the sleeve comes into contact with the top of the insulator 30. For that reason, the sleeve 38 is thereafter not moved inward, no matter how strongly the nut 39 is tightened. Therefore, the pressure on the grommet 37 is kept constant. Since the nut 39 is strongly tightened onto the fixed rigid sleeve 38, the degree of fixation of the nut to the terminal bolt 11 is enhanced. For that reason, the nut 39 is unlikely to loosen due to vibration or the like, and an attaching nut for attaching a lead wire on the nut 39 by pinching the wire between both the nuts can be also firmly and stably tightened to the lead wire and the nut 39.

Thus, the waterproofing device not only prevents water from entering into the coaxial starter 10 along the terminal bolt 11, but also prevents the grommet tightening nut 39 from loosening in long-period use.

The coaxial starter 10 also includes an electric coil 41, an actuator rod 42, a movable contact 43 for connecting the fixed contacts 18 and 19 to each other, an output rotary shaft 44 and a pinion 45, as shown in FIG. 1.

The present invention in not confined to the above-described embodiment, but may be embodied or practiced in other various ways without departing from the spirit or essential character thereof. For example, the sleeve 38 may be threaded on the inside circumferential surface thereof to act as a nut, instead of providing the nut 39. Besides, the sleeve 38 may be composed of a portion extending in the insertion hole of the grommet 37, and the top flange 38a provided separately from that portion and threaded on the inside circumferential surface of the flange to act as a nut. In either case, the pressure of the sleeve 38 onto the grommet 37 depends on the length of the portion of the sleeve, which extends in the insertion hole of the grommet. The length of the portion can be appropriately designed depending on the material of the grommet 37.

What is claimed is:

1. A device for waterproofing around a terminal bolt, having a shank and an outer portion projecting from a casing through an opening thereof having an opening edge, comprising:
   an electric insulator secured on the shank of said bolt, which is located inside said casing;
   a grommet made of an elastic material and having a top and bottom portion, said bottom portion being sized in one dimension to be tightly fitted against said opening edge and sized in another dimension to be located in contact with said insulator, said grommet having an insertion hole through which the said outer portion of said bolt, which projects from said casing, extends; and
   a rigid sleeve having a top end flange and a lower end and being tightly fitted in said hole between said outer portion and said grommet.

2. A device according to the claim 1, wherein the length from the bottom of the top end flange of said rigid sleeve to said lower and thereof is smaller than the depth of the insertion hole of said grommet.

3. A device according to the claim 1, wherein said rigid sleeve has an insert circumferential surface and is threaded on at least a part of said surface.

4. A device according to claim 1, wherein said rigid sleeve is composed of a portion extending in said insertion hole of said grommet, and said top flange is provided separately from said portion.

5. A device according to claim 4, wherein the top flange, has an inside circumferential surface and is threaded on at least a part of said surface.

6. A device according to claim 1 wherein said top portion of said grommet is sized to overlap said opening edge.

* * * * *